US006930701B2

United States Patent
Eom

(10) Patent No.: US 6,930,701 B2
(45) Date of Patent: Aug. 16, 2005

(54) METHOD AND APPARATUS FOR CONTROLLING SCANNING VELOCITY AND AMOUNT OF LIGHT FOR FORMING COLOR IMAGE

(75) Inventor: Yoon-seop Eom, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 68 days.

(21) Appl. No.: 10/340,836

(22) Filed: Jan. 13, 2003

(65) Prior Publication Data

US 2004/0012668 A1 Jan. 22, 2004

(30) Foreign Application Priority Data

Jul. 18, 2002 (KR) ................................ 10-2002-0041984

(51) Int. Cl.⁷ ............................................. B41J 2/435
(52) U.S. Cl. ..................................................... 347/247
(58) Field of Search ................................ 347/225, 229, 347/231, 234, 235, 243, 246, 248, 249, 250, 251, 252, 253, 259, 261, 247

(56) References Cited

U.S. PATENT DOCUMENTS

| | | | | |
|---|---|---|---|---|
| 4,578,689 A | * | 3/1986 | Spencer et al. | 347/129 |
| 4,601,568 A | * | 7/1986 | Takano et al. | 399/200 |
| 4,717,925 A | * | 1/1988 | Shibata et al. | 347/250 |
| 4,893,136 A | * | 1/1990 | Curry | 347/250 |
| 5,239,313 A | * | 8/1993 | Marko et al. | 347/132 |
| 5,253,085 A | * | 10/1993 | Maruo et al. | 358/481 |
| 5,504,517 A | * | 4/1996 | Takashi et al. | 347/246 |

FOREIGN PATENT DOCUMENTS

| | | | | |
|---|---|---|---|---|
| JP | 1-93765 | * | 4/1989 | 399/200 |
| JP | 04-307570 | * | 10/1992 | G03G/15/04 |
| JP | 06-27755 | * | 2/1994 | G03G/15/10 |
| JP | 06-027755 | * | 2/1994 | 399/49 |

* cited by examiner

*Primary Examiner*—Huan Tran
(74) *Attorney, Agent, or Firm*—Staas & Halsey LLP

(57) ABSTRACT

A method and an apparatus to control the scanning velocity and the amount of light to form a color image, including checking the rotation velocity of the scanning motor and varying the amount of light scanned according to the checked rotation velocity of the scanning motor. A motor clock signal to drive a scanning motor is generated without using an additional oscillator by dividing the frequency of a main clock signal, and the frequency of the motor clock signal is varied by varying a division ratio according to the formation velocity of the color image to be printed. Thus, power and noise are reduced by reducing the velocity of the scanning motor, and the amount of light irradiated to a photosensitive body is easily and finely varied according to the variation in the velocity. These effects are achieved without adding additional parts or logic circuits. Accordingly, the amount of light is increased when the velocity of the scanning motor is high, and the amount of light is reduced when the velocity of the scanning motor is low, thereby forming high quality color images.

21 Claims, 5 Drawing Sheets

METHOD AND APPARATUS FOR CONTROLLING SCANNING VELOCITY AND AMOUNT OF LIGHT FOR FORMING COLOR IMAGE

CROSS-REFERENCE TO RELATED APPLICATIONS

This application claims the benefit of Korean Application No. 2002-41984, filed Jul. 18, 2002, in the Korean Intellectual Property Office, the disclosure of which is incorporated herein by reference.

BACKGROUND OF THE INVENTION

1. Field of the Invention

The present invention relates to a color image forming apparatus, such as a color printer or a color copier, and more particularly, to a method and an apparatus to control the scanning velocity and the amount of light scanned in the color image forming apparatus.

2. Description of the Related Art

When the printing velocity in color image forming apparatuses, i.e., color laser printers, is varied so as to improve the deposition ability, the scanning velocity should also be varied according to the variation in the printing velocity. In this case, since the amount of light scanned increases if the scanning velocity is low, the amount of light scanned should be reduced. However, when the amount of light scanned cannot be reduced, there are problems in that toner is not well developed on a photosensitive body and background development occurs on printed paper. In order to prevent these problems, in a conventional method of controlling the amount of light scanned according to the scanning velocity, video data is pulse width modulated (PWM) when the printing velocity is varied, and the amount of light is controlled using a pulse width modulated (PWM) signal. However, the conventional method cannot finely vary the amount of light.

Further, a conventional color laser printer should include an additional oscillator (not shown), which generates a motor clock signal used to control a polygonal motor embedded in a laser scanning unit (LSU) and to adjust the scanning velocity, and thus printer manufacturing costs and volume increase. In this case, the additional oscillator only generates a motor clock signal having a fixed frequency, and thus the frequency of the motor clock signal cannot be varied according to the variation in the printing velocity.

SUMMARY OF THE INVENTION

Accordingly, it is an aspect of the present invention to provide a method of controlling the scanning velocity and the amount of light to form a color image.

It is another aspect of the present invention to provide an apparatus to control the scanning velocity and the amount of light to form a color image, by which the method of controlling the scanning velocity and the amount of light to form a color image is performed.

Additional aspects and advantages of the invention will be set forth in part in the description which follows and, in part, will be obvious from the description, or may be learned by practice of the invention.

The foregoing and/or other aspects of the present invention may be achieved by providing a method of controlling a scanning velocity and an amount of scanned light to form a color image in a color image forming apparatus having a scanning motor which drives a polygonal mirror to scan the light, the method including checking a rotation velocity of the scanning motor, and varying the amount of scanned light according to the checked rotation velocity of the scanning motor.

The foregoing and/or other aspects of the present invention may be achieved by providing an apparatus to control a scanning velocity and an amount of scanned light to form a color image in a color image forming apparatus having a scanning motor which drives a polygonal mirror to scan the light, the apparatus including a rotation velocity checking unit which checks a rotation velocity of the scanning motor and outputs the checked rotation velocity; and a light amount controller which varies the amount of the scanned light in response to the checked rotation velocity that is received from the rotation velocity checking unit.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
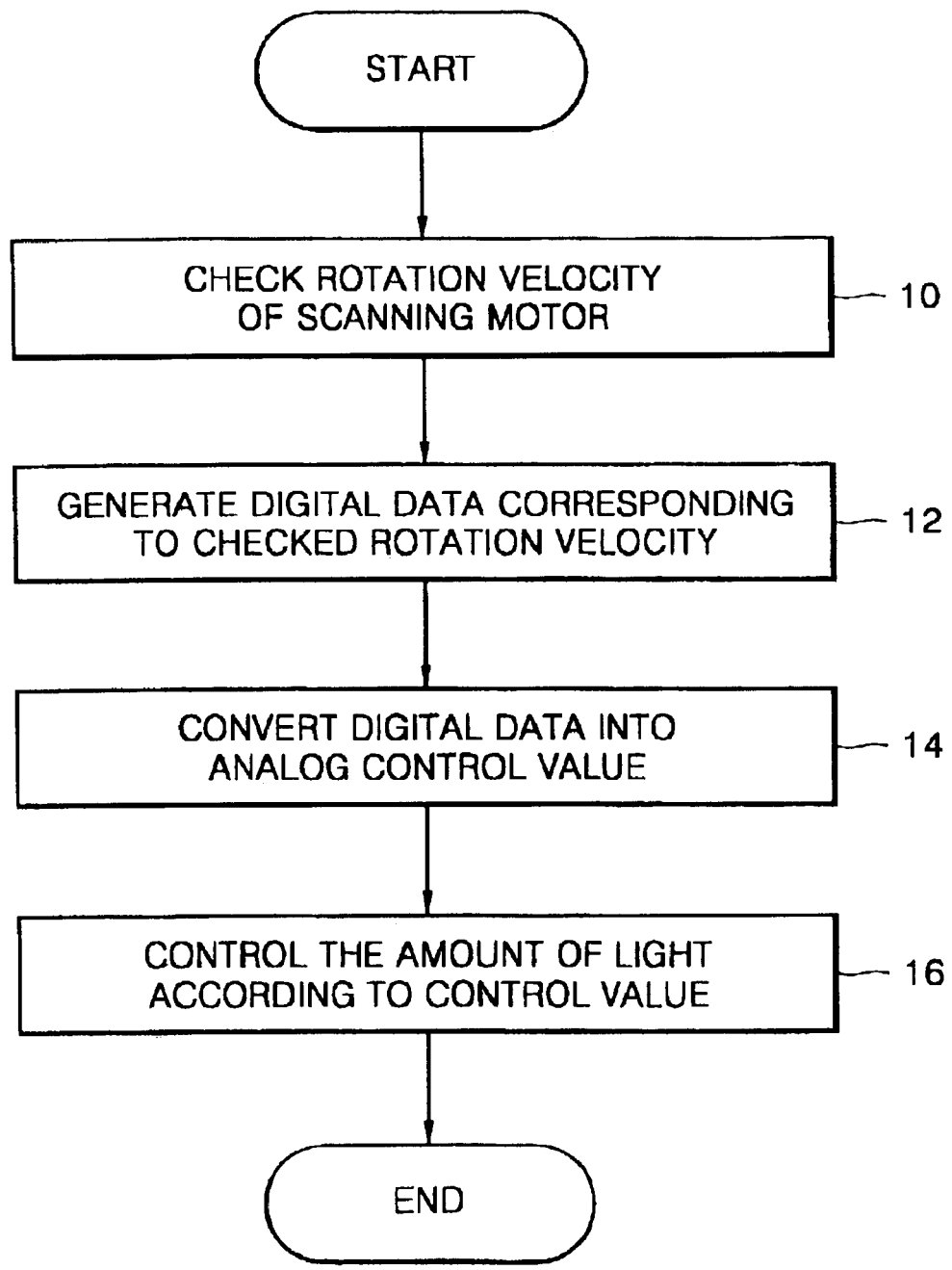
FIG. 1 is a flowchart illustrating a method of controlling the amount of light to form a color image according to an embodiment of the present invention.

Reference will now be made in detail to the present preferred embodiments of the present invention, examples of which are illustrated in the accompanying drawings, wherein like reference numerals refer to like elements throughout.

FIG. 1 is a flowchart illustrating a method of controlling the amount of light to form a color image according to an embodiment of the present invention. The flowchart shown in FIG. 1 includes checking the rotation velocity of a scanning motor (operation 10) and varying the amount of light scanned according to the rotation velocity of the scanning motor (operations 12 through 16).

The scanning motor (not shown) serves to drive a polygonal mirror (not shown). The polygonal mirror has several sides, and each of the sides reflects light emitted from a laser (not shown) onto a photosensitive body, i.e., an organic photoconductive cell (OPC) drum, at different angles. Accordingly, as the scanning motor rotates the polygonal mirror, light is reflected at different angles, and light emitted from the laser may be scanned on the photosensitive body. The above-mentioned scanning motor, the polygonal mirror, and the laser may be embedded in a laser scanning unit (LSU) in a color image forming apparatus, such as a color laser printer.

In operation 10, the rotation velocity of the scanning motor is checked. After operation 10, the amount of light scanned is varied according to the checked rotation velocity of the scanning motor (operations 12 through 16). That is, the rotation velocity of the scanning motor is varied according to the formation velocity of the color image, and the amount of light scanned is varied according to variations in the rotation velocity of the scanning motor. In this way, the method of controlling the amount of light to form a color image according to the present invention can vary the amount of light scanned according to the formation velocity of the color image and/or the rotation velocity of the scanning motor.

For example, if the checked rotation velocity of the scanning motor is low, the amount of light scanned is reduced, and if the checked rotation velocity of the scanning motor is high, the amount of light scanned is increased. This is because if the rotation velocity of the scanning motor is low, the amount of light scanned (irradiated) on a photosensitive body is increased. Thus, the amount of light needs to be reduced. If the rotation velocity of the scanning motor is high, the amount of light that is scanned on the photosensitive body is reduced, and thus the amount of light needs to be increased.

The amount of light scanned is varied according to the checked rotation velocity of the scanning motor (operations 12 through 16). After operation 10, in operation 12, digital data corresponding to the checked rotation velocity of the scanning motor is generated. After operation 12, in operation 14, the generated digital data is converted into an analog control value. After operation 14, in operation 16, the amount of light is controlled according to the control value.

For example, it is assumed that digital data '11' is generated if the rotation velocity of the scanning motor is high, and digital data '00' is generated if the rotation velocity of the scanning motor is low. When the digital data '00' is converted into a control value of 0V, and the digital data '11' is converted into a control value of 5V, the amount of light can be reduced by the laser according to the control value of 0V, and the amount of light can be increased by the laser according to the control value of 5V.

As described above, the amount of light that is irradiated on the photosensitive body is varied according to the rotation velocity of the scanning motor. A method of controlling the scanning velocity to form a color image will be described below.

Figure 2:
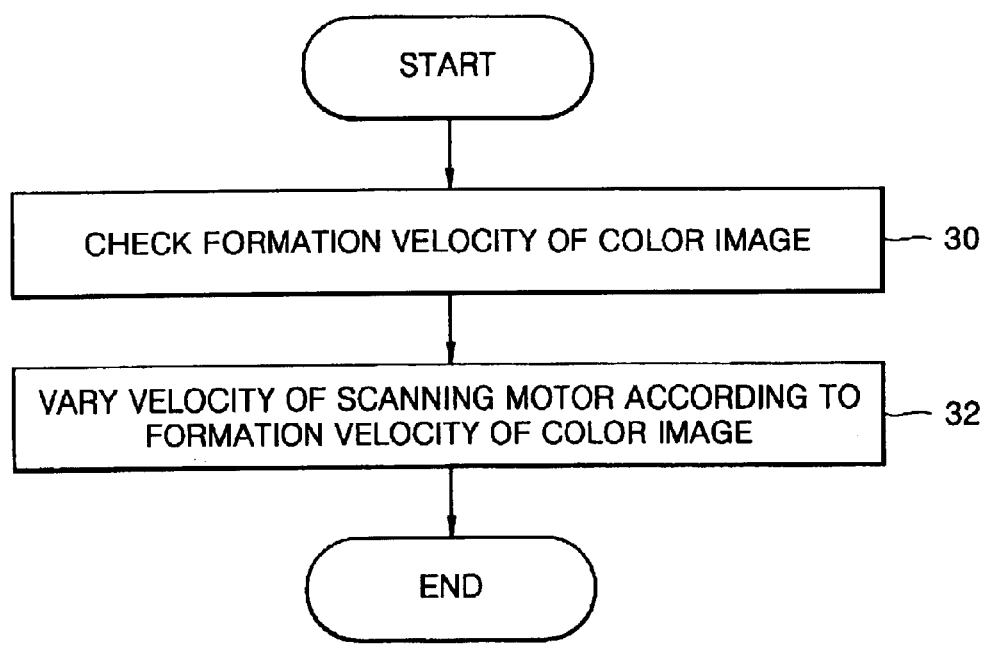
FIG. 2 is a flowchart illustrating a method of controlling the scanning velocity to form a color image according to the embodiment of the present invention.

FIG. 2 is a flowchart illustrating a method of controlling the scanning velocity to form a color image according to an embodiment of the present invention. The flowchart shown in FIG. 2 includes varying the velocity of the scanning motor according to the formation velocity of a color image (operations 30 and 32).

In order to control the velocity of the scanning motor, in operation 30, the formation velocity of the color image is checked. That is, when a color image forming apparatus is a color printer, the printing velocity is determined in operation 30.

After operation 30, in operation 32, the velocity of the scanning motor is varied according to the checked formation velocity of the color image. That is, if the checked formation velocity of the color image is high, the rotation velocity of the scanning motor is varied quickly, and if the checked formation velocity of the color image is low, the rotation velocity of the scanning motor is varied slowly.

For example, when the medium on which a color image is to be formed is an overhead projector or the paper to be printed is thick, the formation velocity of the color image should be reduced. In this case, the velocity of the scanning motor is varied according to the formation velocity of the color image.

Figure 3:
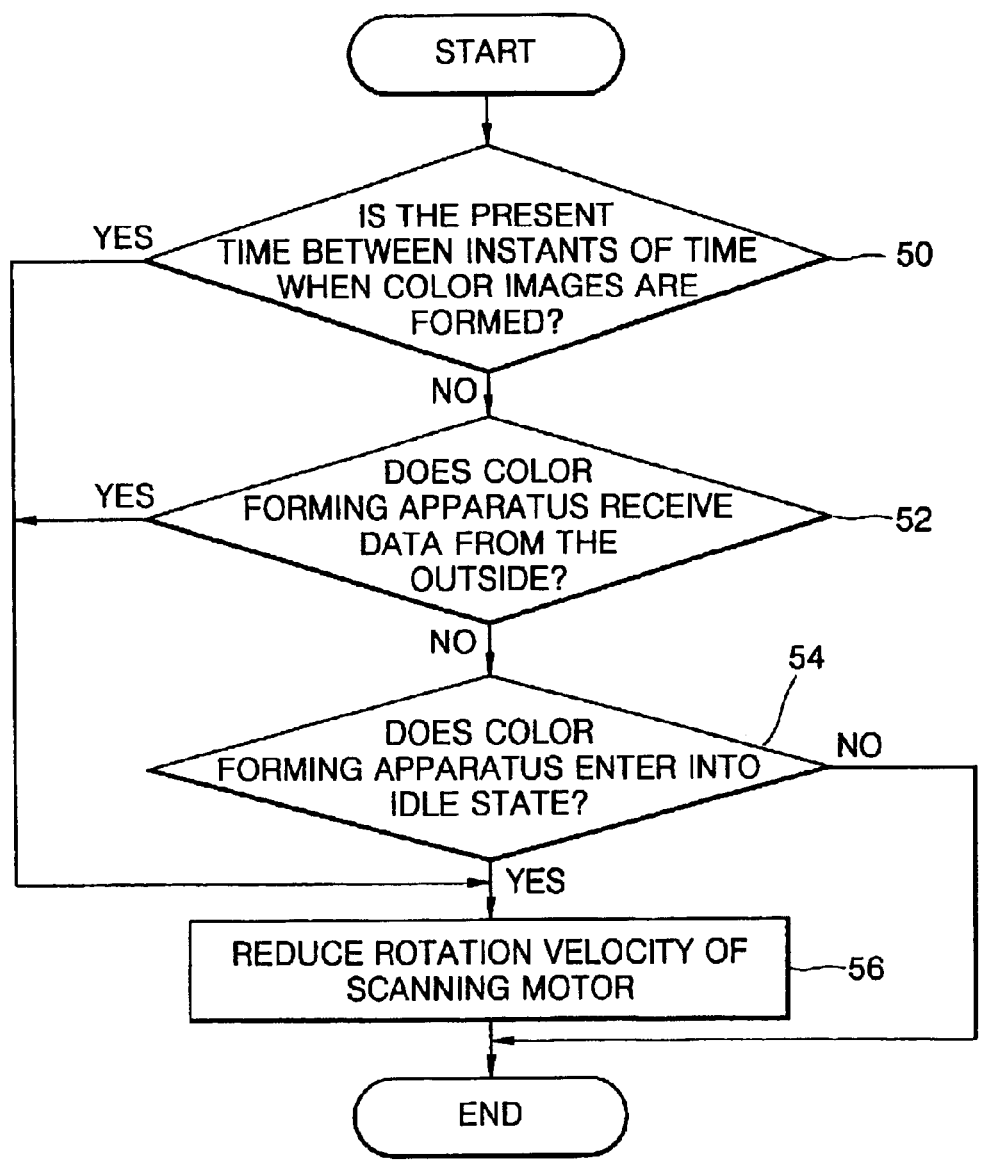
FIG. 3 is a flowchart illustrating a method of controlling the scanning velocity to form a color image according to a second embodiment of the present invention.

FIG. 3 is a flowchart illustrating a method of controlling the scanning velocity to form a color image according to another embodiment of the present invention. The flowchart shown in FIG. 3 includes varying the velocity of the scanning motor according to the state of a color image forming apparatus (operations 50 through 56).

In order to control the velocity of the scanning motor, in operation 50, it is determined whether the present time is between instants of time when color images are formed. For example, when the color image forming apparatus is a color printer, it is determined whether the present time is between a first instant of time when a color image is printed on paper and a second instant of time when another color image is printed on paper.

If it is determined that the present time is not between the instants of time when the color images are formed, in operation 52, it is determined whether the color image forming apparatus receives data from the outside, i.e., a personal computer (PC) (not shown).

If it is determined that the color image forming apparatus does not receive data from the outside, in operation 54, it is determined whether the color image forming apparatus enters into an idle state while the color images are formed. If it is determined that the color image forming apparatus does not enter into the idle state while the color images are formed, the method of FIG. 3 is terminated.

However, if it is determined that the present time is between the instants of time when the color images are formed, or if it is determined that the color image forming apparatus receives data from the outside, or if it is determined that the color image forming apparatus enters into the idle state while the color images are formed, in operation 56, the rotation velocity of the scanning motor is reduced.

After operation 32 shown in FIG. 2 or after operation 56 shown in FIG. 3 is completed, operation 10 shown in FIG. 1 can be performed.

Figure 4:
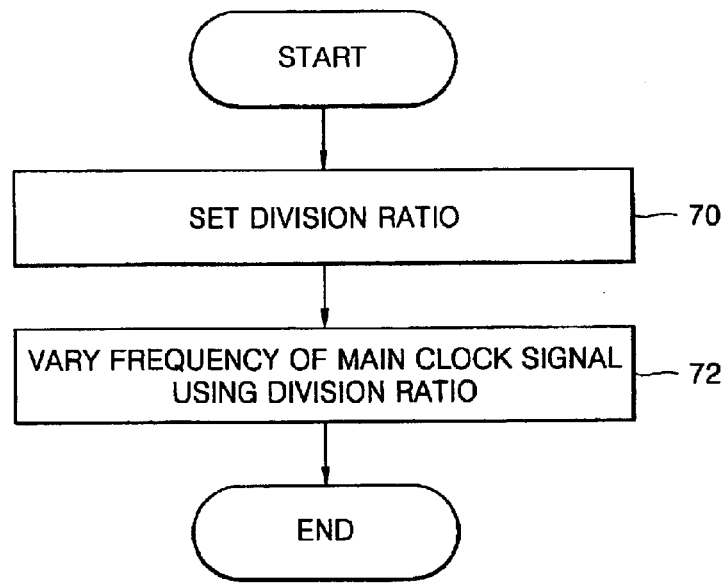
FIG. 4 is a flowchart illustrating operation 32 shown in FIG. 2 or operation 56 shown in FIG. 3.

FIG. 4 is a flowchart illustrating operation 32 shown in FIG. 2 or operation 56 shown in FIG. 3. The flowchart shown in FIG. 4 includes varying the frequency of a main clock signal using a set division ratio (operations 70 and 72).

In operation 70, a division ratio is set. That is, after operation 30, in operation 70, the division ratio is set according to the formation velocity of the color image. Alternatively, if it is determined that the present time is between the instants of time when color images are formed in operation 50, or the color image forming apparatus receives data from the outside in operation 52, or the color image forming apparatus enters into the idle state while the color images are formed in operation 54, in operation 170, the division ratio is set to a large value.

After operation 70, in operation 72, the frequency of the main clock signal used in the color image forming apparatus is varied using the set division ratio. That is, the frequency of the main clock signal is divided by the set division ratio. Thus, the scanning motor can rotate at a velocity corresponding to the varied frequency. Thus, assuming the scanning motor rotates fast as the varied frequency becomes is larger, and the scanning motor rotates slowly as the varied frequency becomes smaller, if the division ratio is set to a large value, the varied frequency becomes smaller, and thus the scanning motor rotates slowly. If the division ratio is set to a small value, the varied frequency becomes larger, and thus the scanning motor rotates quickly.

Hereinafter, the structure and operation of an apparatus to control scanning velocity and the amount of light will be further described.

Figure 5:
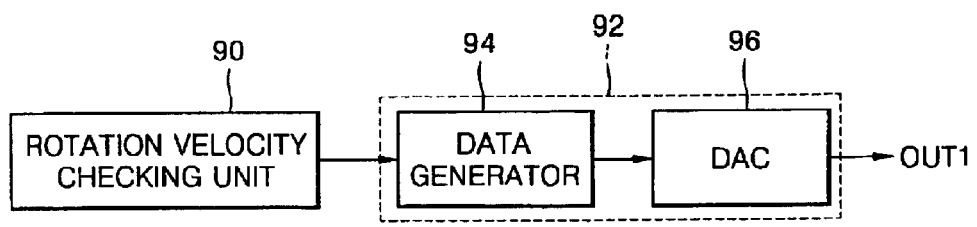
FIG. 5 is a block diagram of an apparatus to control the amount of light to form a color image according to the method of FIG. 1.

FIG. 5 is a block diagram of an apparatus to control the amount of light according to the method shown in FIG. 1. Referring to FIG. 5, the apparatus includes a rotation velocity checking unit 90 and a light amount controller 92.

In order to perform operation 10 shown in FIG. 1, the rotation velocity checking unit 90 shown in FIG. 5 checks the rotation velocity of a scanning motor and outputs the checked rotation velocity to the light amount controller 92.

In order to perform operations 12 through 16, the light amount controller 92 varies the amount of light scanned in response to the checked rotation velocity that is received from the rotation velocity checking unit 90. For this purpose, the light amount controller 92 includes a data generator 94 and a digital to analog converter (DAC) 96.

Here, in order to perform operation 12 shown in FIG. 1, the data generator 94 generates digital data corresponding to the checked rotation velocity that is received from the rotation velocity checking unit 90 and outputs the generated digital data to the DAC 96. In order to perform operation 14, the DAC 96 converts the digital data that is received from the data generator 94, into an analog control value, and outputs the converted control value through an output terminal OUT1.

In this case, in order to perform operation 16, a laser (not shown) controls the amount of light scanned according to the control value that is received from the DAC 96. For example, as described above, when the analog control value that is converted from the generated digital data is a voltage between 0V and 5V, light with the amount corresponding to the voltage can be irradiated by the laser to a photosensitive body, through a polygonal mirror.

Figure 6:
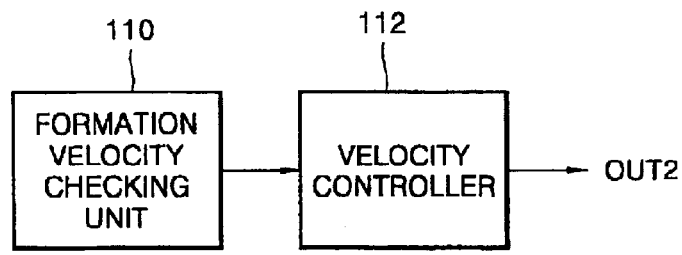
FIG. 6 is a block diagram of an apparatus to control the scanning velocity to form a color image according to the method of FIG. 2.

FIG. 6 is a block diagram of an apparatus to control scanning velocity according to the method shown in FIG. 2. Referring to FIG. 6, the apparatus includes a formation velocity checking unit 110 and a velocity controller 112.

In order to perform operation 30 shown in FIG. 2, the formation velocity checking unit 110 checks the formation velocity of the color image and outputs the checked formation velocity of the color image to the velocity controller 112. In order to perform operation 32, the velocity controller 112 varies the velocity of a scanning motor in response to the checked formation velocity of the color image that is received from the formation velocity checking unit 110. For this purpose, the velocity controller 112 generates a motor clock signal having a frequency corresponding to the checked formation velocity of the color image by dividing the frequency of a main clock signal, and outputs the generated motor clock signal to the scanning motor through an output terminal OUT2. In this case, the scanning motor rotates at a velocity corresponding to the formation velocity of the color image in response to the motor clock signal that is received from the velocity controller 112.

Figure 7:
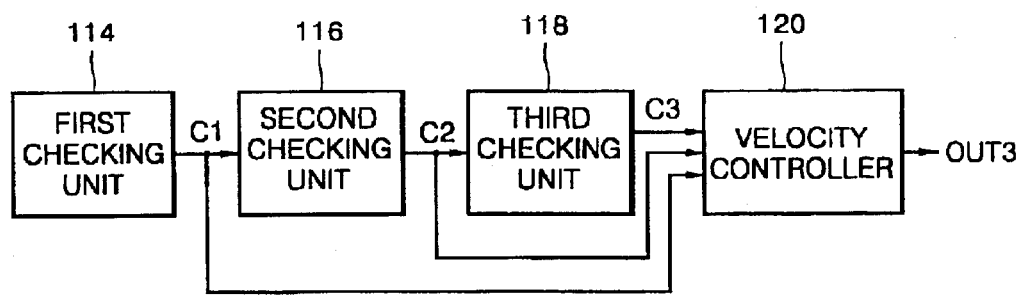
FIG. 7 is a block diagram of an apparatus to control the scanning velocity to form a color image according to the method of FIG. 3.

FIG. 7 is a block diagram of an apparatus to control the scanning velocity according to the method in FIG. 3. The apparatus includes first, second, and third checking units 114, 116, and 118 and a velocity controller 120.

In order to perform operation 50 shown in FIG. 3, the first checking unit 114 checks whether the present time is between the instants of time when color images are formed and outputs the result of the checking as a first control signal C1 to the second checking unit 116 and the velocity controller 120.

In this case, in operation 52, the second checking unit 116 checks whether a color image forming apparatus receives data from the outside, in response to the first control signal C1 that is received from the first checking unit 114, and outputs the result of the checking as a second control signal C2 to the third checking unit 118 and the velocity controller 120. For example, if it is recognized through the first control signal C1 that the present time is not between the instants of time when color images are formed, the second checking unit 116 checks whether the color image forming apparatus receives data from the outside.

In order to perform operation 54, the third checking unit 118 checks whether the color image forming apparatus enters into an idle state while the color images are formed, in response to the second control signal C2 that is received from the second checking unit 116, and outputs the result of the checking as a third control signal C3 to the velocity controller 120. For example, if it is recognized through the second control signal C2 that the data is not received from the outside, the third checking unit 118 checks whether the color image forming apparatus enters into the idle state.

In this case, in order to perform operation 56, the velocity controller 120 reduces the rotation velocity of the scanning motor in response to the first, second, or third control signal C1, C2, or C3 that is respectively received from the first, second or third checking unit 114, 116 or 118. For this purpose, the velocity controller 120 generates a motor clock signal having a low frequency obtained by dividing the frequency of the main clock signal, in response to the first, second, or third control signal C1, C2, or C3 and outputs the generated motor clock signal to the scanning motor through an output terminal OUT3. In this case, the scanning motor rotates slowly in response to the motor clock signal having the low frequency.

Figure 8:
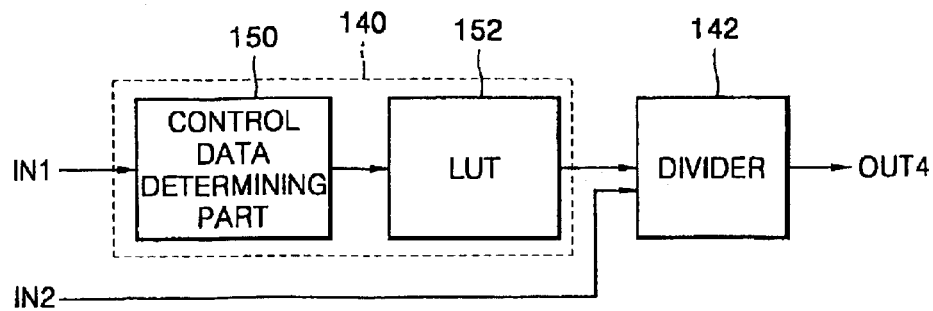
FIG. 8 is a block diagram illustrating the velocity controllers shown in FIGS. 6 and 7.

FIG. 8 is a block diagram illustrating the velocity controllers 112 and 120 shown in FIGS. 6 and 7. Referring to FIG. 8, the velocity controllers 112 and 120 include a division ratio setting unit 140 and a divider 142.

In order to perform operation 70 shown in FIG. 4, the division ratio setting unit 140 shown in FIG. 8 sets a division ratio according to the checked formation velocity of the color image that is received from the formation velocity checking unit 110 through an input terminal IN1, and outputs the set division ratio to the divider 142. Alternatively, the division ratio setting unit 140 sets the division ratio to a large value in response to the first, second, or third control signal C1, C2, or C3 that is received from the first, second, or third checking unit 114, 116, or 118 through the input terminal IN1, and outputs the set division ratio to the divider 142.

For this purpose, according to the present invention, the division ratio setting unit 140 can be operated with a control data determining part 150 and a look up table (LUT) 152. Here, the control data determining part 150 determines control data according to the checked formation velocity of the color image that is received from the formation velocity checking unit 110 through the input terminal IN1, or determines control data in response to the first, second, or third control signal C1, C2 or C3 that is received from the first, second, or third checking unit 114, 116, or 118 through the input terminal IN1, and outputs the determined control data to the LUT 152. In this case, the LUT 152 outputs the division ratio that is read in response to the control data that is inputted as an address from the control data determining part 150 to the divider 142. For example, assuming that 2-bit control data 'ab' is outputted by the control data determining part 150 and division ratios '50', '100', '150', and '200' are stored in addresses '00', '01', '10', and '11' of the LUT 152, respectively, if the control data 'ab' is generated as '11' by the control data determining part 150, the LUT 152 reads the division ratio '200' and outputs the read division ratio '200' to the divider 142.

In order to perform operation 72 shown in FIG. 4, the divider 142 divides the frequency of the main clock signal that is used in the color image forming apparatus and is received through an input terminal IN2, by the set division ratio that is received from the division ratio setting unit 140, and outputs the result of the division to the scanning motor through an output terminal OUT4. In this case, the scanning motor rotates at a velocity corresponding to the result of the division.

As described above, in the method and apparatus to control the scanning velocity and the amount of light to form a color image according to the present invention, the motor clock signal used to drive the scanning motor can be generated without using an additional oscillator by dividing the frequency of the main clock signal, and the frequency of the motor clock signal can be arbitrarily varied by varying the division ratio according to the formation velocity of the color image. Thus, power and noise can be reduced by reducing the velocity of the scanning motor when the scanning motor is not used, and the amount of light that is irradiated on the photosensitive body can be easily and finely varied according to variations in the velocity of the scanning motor when the velocity of the scanning motor is varied in the same way the printing velocity is varied. These effects can be achieved without requiring additional parts or without changing logic circuits. Accordingly, the amount of light can be increased when the velocity of the scanning motor is high, and the amount of light can be reduced when the velocity of the scanning motor is low, thereby forming high quality color images.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of controlling a scanning velocity and an amount of scanned light to form a color Image in a color image forming apparatus having a scanning motor which drives a polygonal mirror to scan the light, the method comprising:
   checking a rotation velocity of the scanning motor; and
   varying the amount of scanned light according to the checked rotation velocity of the scanning motor.

2. The method of claim 1, wherein the varying comprises:
   generating digital data corresponding to the checked rotation velocity;
   converting the digital data into an analog control value; and
   controlling the amount of scanned light according to the control value.

3. The method of claim 1, further comprising:
   checking a formation velocity of the color image; and
   varying the rotation velocity of the scanning motor according to the checked formation velocity of the color image.

4. The method of claim 1, further comprising:
   determining whether a present time is between instants of time when a plurality of the color images are formed;
   determining whether the color image forming apparatus receives data from an outside upon determining that the present time is not between the instants of time when the color images are formed,
   determining whether the color image forming apparatus enters into an idle state while the color images are formed upon determining that the color image forming apparatus does not receive the data from the outside; and
   reducing the rotation velocity of the scanning motor upon determining that the present time is between the instants of time when the color images are formed, or upon determining that the color image forming apparatus receives the data from the outside, or upon determining that the color image forming apparatus enters into the idle state while the color images are formed.

5. The method of claim 3, wherein the varying of the rotation velocity of the scanning motor comprises:
   setting a division ratio according to a formation velocity of the color image; and
   varying a frequency of a main clock signal used in the color image forming apparatus using the set division ratio,
   wherein the rotation velocity of the scanning motor corresponds to the varied frequency.

6. The method of claim 4, wherein the reducing of the rotation velocity comprises:
   setting a division ratio to a large value upon determining that the present time is between the instants of time when the color images are formed, or upon determining that the color forming apparatus receives the data from the outside, or upon determining that the color image forming apparatus enters into the idle state while the color images are formed; and
   varying a frequency of a main clock signal used in the color image forming apparatus using the set division ratio,
   wherein the rotation velocity of the scanning motor corresponds to the varied frequency.

7. An apparatus to control a scanning velocity and an amount of scanned light to form a color image in a color image forming apparatus having a scanning motor which drives a polygonal mirror to scan the light, the apparatus comprising:
   a rotation velocity checking unit which checks a rotation velocity of the scanning motor and outputs the checked rotation velocity; and
   a light amount controller which vanes the amount of the scanned light in response to the checked rotation velocity that is received from the rotation velocity checking unit.

8. The apparatus of claim 7, wherein the light amount controller comprises:
   a data generator which generates digital data corresponding to the checked rotation velocity that is received from the rotation velocity checking unit and outputs the generated digital data; and a digital to analog converter (DAC) which converts the digital data that is received from the data generator into an analog control value and outputs the converted control value, wherein the amount of scanned light is controlled according to the converted control value that is received from the DAC.

9. The apparatus of claim 7, further comprising:

a formation velocity checking unit which checks a formation velocity of the color image and outputs the checked formation velocity; and a velocity controller which varies the rotation velocity of the scanning motor in response to the checked formation velocity of the color image that is received from the formation velocity checking unit.

10. The apparatus of claim 7, further comprising:

a first checking unit which checks whether a present time is between instants of time when a plurality of the color images are formed, and outputs the result of the checking as a first control signal;

a second checking unit which checks whether the color image forming apparatus receives data from an outside, in response to the first control signal, and outputs the result of the checking as a second control signal;

a third checking unit which checks whether the color image forming apparatus enters into an idle state while the color images are formed, in response to the second control signal, and outputs the result of the checking as a third control signal; and a velocity controller which reduces the rotation velocity of the scanning motor in response to the first, second, or third control signal.

11. The apparatus of claim 9, wherein the velocity controller comprises:

a main clock to generate a signal;

a division ratio selling unit which sets a division ratio according to the formation velocity of the color image, and outputs the set division ratio; and a divider which divides a frequency of the main clock signal used in the color image forming apparatus by the set division ratio, and outputs a result of the division;

wherein the rotation velocity of the scanning motor corresponds to the result of the division.

12. The apparatus of claim 10, further comprising a main clock to generate a signal, wherein the velocity controller comprises:

a division ratio setting unit which sets a division ratio to a large value in response to the first, second, or third control signal, and outputs the set division ratio; and a divider which divides a frequency of the main clock signal used in the color image forming apparatus by the set division ratio, and outputs the result of the division;

wherein the rotation velocity of the scanning motor corresponds to the result of the division.

13. The apparatus of claim 11, wherein the division ratio setting unit comprises:

a control data determining part which determines control data according to the checked formation velocity of the color image and outputs the determined control data; and a look up table which outputs the division ratio in response to the control data that is inputted as an address from the control data determining part, and outputs the read division ratio to the divider.

14. The apparatus of claim 12, wherein the division ratio setting unit comprises:

a control data determining part which determines control data in response to the first, second, or third control signal and outputs the determined control data; and a look up table which outputs the division ratio in response to the control data that is inputted as an address from the control data determining part, and outputs the read division ratio to the divider.

15. A method of controlling a color image forming apparatus, comprising:

checking a rotation velocity of a scanning motor;

generating digital data corresponding to the checked rotation velocity;

converting the digital data to analog data; and varying an amount of light scanned by the scanning motor to form an image according to the converted data.

16. The method of claim 15, further comprising:

checking a formation velocity of the image; and varying the rotation velocity according to the checked formation velocity.

17. The method of claim 15, wherein a plurality of the images are formed, and the velocity of the scanning motor is varied based upon a status of the images.

18. The method of claim 16, wherein the rotation velocity is varied in direct relation to the checked formation velocity.

19. The method of claim 15, wherein the amount of light is varied in direct relation to the checked rotation velocity.

20. An apparatus to form a color image, comprising:

a motor;

a detector to detect a formation velocity of the color image; and a clock to generate a signal having a variable frequency corresponding to a rotation speed of the motor, the frequency being varied based upon a division ratio set according to the detected formation velocity.

21. The apparatus of claim 20, further comprising:

a polygonal mirror, driven by the motor, to scan light and thereby form the image.

* * * * *

UNITED STATES PATENT AND TRADEMARK OFFICE
CERTIFICATE OF CORRECTION

PATENT NO. : 6,930,701 B2  
DATED : August 16, 2005  
INVENTOR(S) : Yoon-seop Eom It is certified that error appears in the above-identified patent and that said Letters Patent is hereby corrected as shown below:

Column 7,  
Line 56, replace "Image" with -- image --.

Column 8,  
Line 60, replace "vanes" with -- varies --.

Column 9,  
Line 40, replace "selling" with -- setting --.

Signed and Sealed this

Sixth Day of June, 2006

JON W. DUDAS  
*Director of the United States Patent and Trademark Office*